(12) United States Patent
Zheng et al.

(10) Patent No.: US 12,108,278 B2
(45) Date of Patent: Oct. 1, 2024

(54) SIDELINK BUFFER STATUS REPORT SENDING METHOD, SIDELINK BUFFER STATUS REPORT RECEIVING METHOD, AND DEVICE

(71) Applicant: VIVO MOBILE COMMUNICATION CO., LTD., Guangdong (CN)

(72) Inventors: Qian Zheng, Dongguan (CN); Xiaodong Yang, Dongguan (CN); Yue Ma, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 290 days.

(21) Appl. No.: 17/383,792

(22) Filed: Jul. 23, 2021

(65) Prior Publication Data

US 2021/0352682 A1    Nov. 11, 2021

Related U.S. Application Data

(63) Continuation of application No. PCT/CN2020/073482, filed on Jan. 21, 2020.

(30) Foreign Application Priority Data

Jan. 23, 2019  (CN) .......................... 201910065287.9

(51) Int. Cl.
  *H04W 28/02*  (2009.01)
  *H04W 28/06*  (2009.01)
  (Continued)

(52) U.S. Cl.
  CPC ....... *H04W 28/0278* (2013.01); *H04W 28/06* (2013.01); *H04W 72/121* (2013.01);
  (Continued)

(58) Field of Classification Search
  CPC ....... H04W 4/30–80; H04W 8/22–245; H04W 24/02–10; H04W 28/02–26;
  (Continued)

(56) References Cited

U.S. PATENT DOCUMENTS 10,257,743 B2   4/2019  Yi et al.
2016/0044707 A1*  2/2016  Folke ................ H04W 28/0278
(Continued)

FOREIGN PATENT DOCUMENTS

CN    105163346 A   12/2015
CN    107872885 A   4/2018
(Continued)

OTHER PUBLICATIONS

Ericsson, "Management of Sidelink logical channel groups," 3GPP TSG-RAN WG2 #91 bis, Tdoc R2-154154, Oct. 9, 2015 (Year: 2015).*

(Continued)

*Primary Examiner* — Timothy J Weidner
(74) *Attorney, Agent, or Firm* — Harness, Dickey & Pierce, P.L.C.

(57) ABSTRACT

A sidelink buffer status report sending method includes: in a case where an uplink resource is not enough to report a total data amount of buffer data of all sidelink logical channels, sending a truncated SL BSR based on preset information of the buffer data, at least one domain of the SL BSR being associated with the preset information; or in a case where an uplink resource is not enough to report a total data amount of buffer data of all sidelink logical channels, sending the SL BSR in at least one SL BSR format based on preset priorities, the SL BSR format being determined based on the preset information of the buffer data.

20 Claims, 3 Drawing Sheets in a case where an uplink resource is not enough to report a total data amount of buffer data of all sidelink logical channels, a truncated SL BSR is sent based on preset information of the buffer data, where at least one domain of the SL BSR is associated with the preset information; or in a case where an uplink resource is not enough to report a total data amount of buffer data of all sidelink logical channels, the SL BSR in at least one SL BSR format are sent based on preset priorities, where the SL BSR format is determined based on preset information of the buffer data. — S101

(51) Int. Cl.
| | |
|---|---|
| *H04W 72/12* | (2023.01) |
| *H04W 72/121* | (2023.01) |
| *H04W 72/20* | (2023.01) |
| *H04W 72/21* | (2023.01) |
| *H04W 72/542* | (2023.01) |
| *H04W 72/566* | (2023.01) |
| *H04W 84/02* | (2009.01) |
| *H04W 88/06* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ....... *H04W 72/1215* (2013.01); *H04W 72/20* (2023.01); *H04W 72/21* (2023.01); *H04W 72/542* (2023.01); *H04W 72/569* (2023.01); *H04W 84/02* (2013.01); *H04W 88/06* (2013.01); *H04W 88/08* (2013.01); *H04W 92/02* (2013.01); *H04W 92/10* (2013.01); *H04W 92/18* (2013.01)

(58) Field of Classification Search
CPC ... H04W 72/02–569; H04W 76/10–50; H04W 80/00–02; H04W 84/005–22; H04W 88/02–12; H04W 92/02–04; H04W 92/08–10; H04W 92/16–20
See application file for complete search history.

(56) References Cited

U.S. PATENT DOCUMENTS

| | | | |
|---|---|---|---|
| 2017/0093541 A1 | 3/2017 | Pan et al. | |
| 2017/0245245 A1 | 8/2017 | Kim et al. | |
| 2017/0311317 A1 | 10/2017 | Dinan | |
| 2019/0223048 A1 | 7/2019 | Xu et al. | |
| 2020/0077293 A1* | 3/2020 | Lee | H04W 28/0278 |
| 2021/0168840 A1* | 6/2021 | Han | H04W 28/0278 |
| 2022/0061055 A1* | 2/2022 | Freda | H04W 28/0278 |

FOREIGN PATENT DOCUMENTS

| | | |
|---|---|---|
| CN | 107950047 A | 4/2018 |
| WO | WO-2016122114 A1 | 8/2016 |
| WO | WO-2017052106 A1 | 3/2017 |
| WO | WO-2017073944 A1 | 5/2017 |

OTHER PUBLICATIONS

Supplementary European Search Report regarding Patent Application No. 20745946.2-1215/3917254; PCT/CN2020/073482, dated Feb. 17, 2022.

"Consideration on miscellaneous MAC aspects for NR sidelink design," Huawei, HiSilicon, 3GPP TSG-RAN WG2 Meeting #104, R2-1818274, dated Nov. 16, 2018.

"ProSe BSR handling for D2D Communication," ETRI, 3GPP TSG-RAN WG2 #88, R2-145016, dated Nov. 21, 2014.

Ericsson, "Management of Sidelink logical channel groups," 3GPP TSG-RAN WG2 #91bis, Tdoc R2-154154, Oct. 9, 2015.

Intel Corporation, "Open aspects of priority handling for ProSe communication" 3GPP TSG RAN WG2 Meeting #91, R2-154385, Oct. 9, 2015.

First Office Action regarding Chinese Patent Application No. 201910065287.9, dated Mar. 10, 2021. Translation provided by Bohui Intellectual Property.

Qualcomm Incorporated, R2, "Running stage 2 CR TS 36.300 to capture agreement on eD2D," 3GPP TSG-RAN WG2 #91Bis R2-154899, Oct. 9, 2015.

3rd Generation Partnership Project, "Study on extended architecture support for proximity-based services," 3GPP TR 23.713 V1.3.0 Release 13, May 2015.

LG Electronics Inc., "Construction of SL BSR in supporting ProSe Priority," 3GPP TSG-RAN WG2 Meeting #91bis R2-154321, Oct. 4, 2015.

International Search Report and Written Opinion of the International Searching Authority issued in PCT/CN2020/073482, Apr. 17, 2020; Translation provided by Bohui Intellectual Property.

Huawei et al., "BSR Format", Document R2-1705201, 3GPP TSG-RAN WG2 Meeting #98, May 15-19, 2017.

First Office Action regarding European Patent Application No. 20745946.2, dated May 7, 2024.

Intel Corporation, "Enhancements of SR/BSR in NR", Document R2-1701723, 3GPP TSG RAN WG2 Meeting #97, Feb. 13-17, 2017.

Second Office Action regarding Chinese Patent Application No. 201910065287.9, dated Sep. 14, 2021. Translation provided by Bohui Intellectual Property.

* cited by examiner in a case where an uplink resource is not enough to report a total data amount of buffer data of all sidelink logical channels, a truncated SL BSR is sent based on preset information of the buffer data, where at least one domain of the SL BSR is associated with the preset information; or in a case where an uplink resource is not enough to report a total data amount of buffer data of all sidelink logical channels, the SL BSR in at least one SL BSR format are sent based on preset priorities, where the SL BSR format is determined based on preset information of the buffer data. — S101

FIG. 1

| Destination identity 1 | LCG ID1 | Data amount 1 | Oct 1 |
| Data amount 1 | Destination identity 2 | | Oct 2 |
| LCG ID2 | Data amount 2 | | Oct 3 |

...

| Destination identity N-1 | LCG IDN-1 | Data amount N-1 | Oct 1.5×N-2 |
| Data amount N-1 | Destination identity N | | Oct 1.5×N-1 |
| LCG IDN | Data amount N | | Oct 1.5×N |

FIG. 2

| Destination identity 1 | LCG ID1 | Data amount 1 | | | | Oct 1 |
| Data amount 1 | Destination identity 2 | | | | | Oct 2 |
| LCG ID2 | Data amount 2 | | | | | Oct 3 |

...

| Destination identity N-1 | LCG IDN-1 | Data amount N-1 | | | | Oct 1.5×N-0.5 |
| Data amount N-1 | R | R | R | R | | Oct 1.5×N+0.5 |

FIG. 3 a truncated SL BSR is received, where the truncated SL BSR is sent by a terminal device based on preset information of the buffer data in a case where an uplink resource is not enough to report a total data amount of buffer data of all sidelink logical channels, and at least one domain of the SL BSR is associated with the preset information; or the SL BSR in at least one SL BSR format are received, where the SL BSR in at least one SL BSR format are sent by a terminal device according to preset priorities in a case where an uplink resource is not enough to report a total data amount of buffer data of all sidelink logical channels, and the SL BSR format is determined based on preset information of the buffer data — S401

SIDELINK BUFFER STATUS REPORT SENDING METHOD, SIDELINK BUFFER STATUS REPORT RECEIVING METHOD, AND DEVICE

CROSS-REFERENCE TO RELATED APPLICATIONS

This application is a Bypass Continuation Application of PCT/CN2020/073482, filed on Jan. 21, 2020, which claims priority to Chinese Patent Application No. 201910065287.9 filed on Jan. 23, 2019, which are incorporated herein by reference in their entirety.

TECHNICAL FIELD

The present disclosure relates to the technical field of communication, and in particular, to a sidelink buffer status report sending method, a sidelink buffer status report receiving method, and device.

BACKGROUND

A sidelink (SL), also referred to as a side link or an edge link, is used to perform direct data transmission between a terminal device (also called User Equipment, abbreviated as UE) without using a network device.

SUMMARY

According to a first aspect, a sidelink buffer status report sending method is provided, and applied to a terminal device, where the method includes:
  in a case where an uplink resource is not enough to report a total data amount of buffer data of all sidelink logical channels, sending a truncated sidelink buffer status report (SL BSR) based on preset information of the buffer data, at least one domain of the SL BSR being associated with the preset information; or
  in a case where an uplink resource is not enough to report a total data amount of buffer data of all sidelink logical channels, sending the SL BSR in at least one SL BSR format based on preset priorities, the SL BSR format being determined based on preset information of the buffer data.

According to a second aspect, a sidelink buffer status report receiving method is provided, and applied to a network device, where the method includes:
  receiving a truncated SL BSR, the truncated SL BSR being sent by a terminal device based on preset information of the buffer data in a case where an uplink resource is not enough to report a total data amount of buffer data of all sidelink logical channels, and at least one domain of the SL BSR being associated with the preset information, or
  receiving the SL BSR in at least one SL BSR format, the SL BSR in at least one SL BSR format being sent by a terminal device according to the preset priorities in a case where an uplink resource is not enough to report a total data amount of buffer data of all sidelink logical channels, and the SL BSR format being determined based on preset information of the buffer data.

According to a third aspect, a terminal device is provided, where the terminal device includes:
  a sending module, used to: in a case where an uplink resource is not enough to report a total data amount of buffer data of all sidelink logical channels, send a truncated SL BSR based on preset information of the buffer data, at least one domain of the SL BSR being associated with the preset information; or used to: in a case where an uplink resource is not enough to report a total data amount of buffer data of all sidelink logical channels, send the SL BSR in at least one SL BSR format based on preset priorities, the SL BSR format being determined based on preset information of the buffer data.

According to a fourth aspect, a network device is provided, where the network device includes:
  a receiving module, used to receive a truncated SL BSR, the truncated SL BSR being sent by a terminal device based on preset information of the buffer data in a case where an uplink resource is not enough to report a total data amount of buffer data of all sidelink logical channels, and at least one domain of the SL BSR being associated with the preset information; or used to receive the SL BSR in at least one SL BSR format, the SL BSR in at least one SL BSR format being sent by a terminal device according to preset priorities in a case where an uplink resource is not enough to report a total data amount of buffer data of all sidelink logical channels, and the SL BSR format being determined based on preset information of the buffer data.

According to a fifth aspect, a terminal device is provided, where the terminal device includes a memory, a processor and a radio communication program which is stored on the memory and capable of running on the processor. When being executed by the processor, the radio communication program implements the steps of the method as defined in the first aspect.

According to a sixth aspect, a network device is provided, where the network device includes a memory, a processor and a radio communication program which is stored on the memory and capable of running on the processor. When being executed by the processor, the radio communication program implements the steps of the method as defined in the second aspect.

According to a seventh aspect, a non-transitory computer-readable storage medium is provided, where the non-transitory computer-readable storage medium stores a radio communication program. When being executed by a processor, the radio communication program implements the steps of the method according to the first aspect or the second aspect.

BRIEF DESCRIPTION OF DRAWING

To describe the technical solutions in the embodiments of the present disclosure or the related art more clearly, the following briefly describes the accompanying drawings required for describing the embodiments or the related art. Apparently, the accompanying drawings in the following description show merely some embodiments recorded in the present disclosure, and a person of ordinary skill in the art may still derive other drawings from these accompanying drawings.

DETAILED DESCRIPTION OF EMBODIMENTS

In order to help a person skilled in the art better understand the technical solutions of the present disclosure, the following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

It should be understood that, the technical solutions of the embodiments of the present disclosure may be applied to various communications systems, for example: a global system of mobile communication (GSM), a code division multiple address (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS) or a worldwide interoperability for microwave access (WiMAX) communication system, a 5th generation (5G) system, or a new radio (NR) system.

UE, which may also be called a mobile terminal, mobile user equipment, terminal device, etc., may communicate with at least one core network through a radio access network (RAN). The terminal device may be a mobile terminal, such as a mobile phone (or called "cell" phone) and a computer with a mobile terminal, for example, it may be portable, pocket, handheld, computer in-built or vehicle-mounted mobile devices, which exchange language and/or data with the radio access network.

A network device is a device deployed in the radio access network and used to receive feedback information for the sidelink. The network device may be a base station. The base station may be a base transceiver station (BTS) in GSM or CDMA, or may be a NodeB in WCDMA, or may be an evolved Node B (eNB, or e-NodeB) and a 5G gNodeB (gNB) in LTE, or may be a network side device in a subsequent evolutional communications system. However, the wording does not constitute a limitation on the protection scope of the present disclosure.

It should be noted that, during description of specific embodiments, sequence numbers of processes do not mean execution sequences. The execution sequences of the processes should be determined according to functions and internal logic of the processes, and should not be construed as any limitation on the implementation processes of the embodiments of the present disclosure.

A SL BSR is applied to sidelink terminal device for telling a network device the amount (in bytes) of to-be-sent data of all logical channels in one logical channel group (LCG) based on a near service destination. In the LTE system, since the sidelink only supports broadcasting service, when the uplink resource is not enough to report the data size buffered in all sidelink logical channels, the truncated SL BSR is used for reporting, and the specific truncation measure is to report the buffer data size included in the LCG as much as possible.

However, in the NR system, besides the broadcasting service, the sidelink may also support unicast service and groupcast service, and may also support LTE Sidelink and NR Sidelink simultaneously, so that the original SL BSR sending method is no longer applicable when the uplink is not enough to report the data size buffered in all the sidelink logical channels.

A sidelink buffer status report sending method provided by an embodiment of the present disclosure will be described below.

Figure 1:
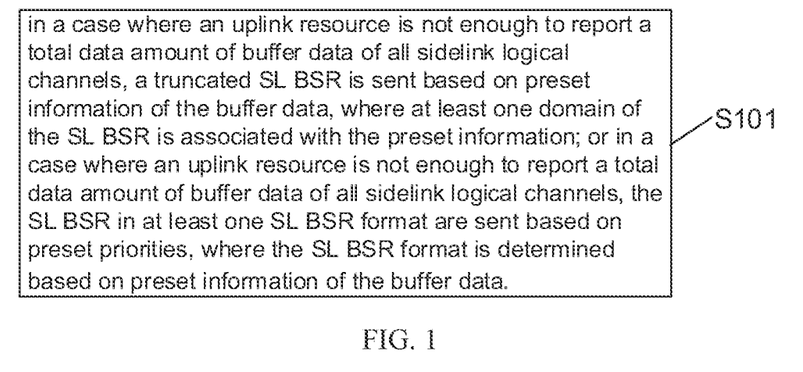
FIG. 1 is a schematic flowchart of a sidelink buffer status report sending method according to an embodiment of the present disclosure.

As shown in FIG. 1, a sidelink buffer status report sending method provided by an embodiment of the present disclosure may include:

Step 101: in a case where an uplink resource is not enough to report a total data amount of buffer data of all sidelink logical channels, a truncated SL BSR is sent based on preset information of the buffer data, where at least one domain of the SL BSR is associated with the preset information; or in a case where an uplink resource is not enough to report a total data amount of buffer data of all sidelink logical channels, the SL BSR in at least one SL BSR format are sent based on preset priorities, where the SL BSR format is determined based on preset information of the buffer data.

That is, in the embodiment of the present disclosure, when the uplink resource is not enough to report the total data amount of the buffer data of all the sidelink logical channels, the data amount (or data size) of the buffer data of the sidelink logical channel may be reported through two implementation manners, which are described respectively below.

In a first implementation manner, a truncated SL BSR is sent based on preset information of buffer data of all sidelink logical channels, and at least one domain of the sent truncated SL BSR is associated with the preset information. The at least one domain of the truncated SL BSR may be associated with the preset information in implicit or explicit ways, which will be illustrated respectively below.

The preset information includes at least one of a radio access technology (RAT) type, an SL service transmission mode or a quality of service (QoS) parameter.

The RAT type may include at least one of a long term evolution LTE type, a NR type or a RAT type which possibly occurs subsequently.

The SL service transmission mode may include at least one of unicast, groupcast or broadcast.

The QoS parameter may include but is not limited to at least one of the followings: a priority of a data packet or data flow, a latency (in millisecond (ms)) of the data packet or data flow, a reliability (represented by percentage (%)) of the data packet or data flow, a communication range (in meter) of the data packet or data flow, a payload (in byte) of the data packet or data flow, a transmission rate (represented by message/sec) of the data packet or data flow, a data rate (in Mbps) of the data packet or data flow, or the like.

In a first example, at least one domain of the truncated SL BSR is associated with the preset information in an implicit way. Optionally, the format of the SL BSR (including the truncated SL BSR and the original SL BSR) includes: a destination index (destination index) domain, a logical channel group index (LCG ID) domain and a buffer size level domain, where at least one of the destination index domain or the logical channel group index is associated with the preset information.

It should be noted that in the embodiment of the present disclosure, the original SL BSR may be the SL BSR shown in the following Table 1, and the corresponding codepoint is 10111. Furthermore, the truncated SL BSR refers to the SL BSR truncated based on the original SL BSR.

For example, the destination index domain and/or the logical channel group index domain are implicitly associated with the RAT type, such as the destination index domain and/or the logical channel group index domain may be implicitly associated with the LTE type and/or the NR type.

For another example, the destination index domain and/or the logical channel group index domain are implicitly associated with the SL transmission mode, such as the destination index domain and/or the logical channel group index domain may be implicitly associated with at least one of unicast, groupcast or broadcast.

For another example, the destination index domain and/or the logical channel group index domain are implicitly associated with the QoS parameter, such as the destination index domain and/or the logical channel group index domain may be implicitly associated with one or more QoS parameters above.

The implicit association may be understood as establishing a mapping relationship between the destination index domain and/or the logical channel group index domain in the SL BSR format and the preset information, so that after user equipment sends the SL BSR to a network device, the network device may know the preset information carried by the SL BSR based on the mapping relationship without directly carrying the preset information in the SL BSR.

In a second example, at least one domain of the truncated SL BSR is associated with the preset information in an explicit way. Optionally, the format of the SL BSR (including the truncated SL BSR and the original SL BSR) includes: a destination index domain, a LCG ID domain, a buffer size level domain and at least one additional domain, where the at least one additional domain is used to bear the preset information, so that the at least one additional domain is associated with the preset information.

That is, the additional domain may be considered as a domain which is added in the format of the SL BSR specially for bearing the preset information.

For example, the format of the SL BSR may include the following domains: a destination index domain, a logical channel group index domain, a domain of buffer size level and an RAT type domain, where the RAT type domain is an additional domain, and the RAT type domain is used to bear RAT type information, such as LTE PC5 interface information or NR PC5 interface information, the PC5 interface being an interface between user equipment for direction communication without a network device.

For another example, the format of the SL BSR may include the following domains: a destination index domain, a logical channel group index domain, a domain of buffer size level and an SL transmission mode domain, where the SL transmission mode domain is an additional domain, and the SL transmission mode domain is used to bear SL transmission mode information, such as unicast, groupcast or broadcast information.

For another example, the format of the SL BSR may include the following domains: a destination index domain, a logical channel group index domain, a domain of buffer size level, an RAT type domain and an SL transmission mode domain, where the RAT type domain and the SL transmission mode domain are two additional domains, the RAT type domain is used to bear RAT type information, such as LTE PC5 interface information or NR PC5 interface information, and the SL transmission mode domain is used to bear SL transmission mode information, such as unicast, groupcast or broadcast information.

A domain special for bearing the QoS parameter may be added in the format of the SL BSR, which will not be listed here.

It may be understood that no matter whether at least one domain of the format of the SL BSR (including the truncated SL BSR and the original SL BSR) is implicitly or explicitly associated with the preset information, the truncated SL BSR sent by the terminal device carries the preset information, therefore, the network device may acquire more comprehensive buffer status information of the terminal device, thereby assigning resources to the terminal device better and improving the communication effectiveness.

On the premise of the first example and the second example above, the step that the truncated SL BSR is sent based on the preset information of the buffer data may include: the reporting sequence of the data amount of buffer data of different types is determined based on the preset information of the buffer data of all the sidelink logical channels; and the truncated SL BSR is sent based on the reporting sequence, so that the data amount of the buffer data is reported when the uplink resource is not enough to report the total data amount of the buffer data of all the sidelink logical channels.

Optionally, target buffer data ranked in the top may be determined based on the reporting sequence; and then SL BSR which preferentially bears the data amount of the target buffer data in sequence is sent, that is, the amount of the buffer data ranked in the top is sent as much as possible.

How to determine the reporting sequence of the data amount of buffer data of different types is described below through several examples.

In an example, if the preset information of the buffer data of all the sidelink logical channels includes an RAT type and there is more than one RAT type, the step that the reporting sequence of the data amount of buffer data of different types is determined based on the preset information includes: the reporting sequence of the data amount of the buffer data of different RAT types in the buffer data is determined based on preset priorities of different RAT types.

The preset priorities of different RAT types may be stipulated by a protocol, configured by a network device or pre-configured by a terminal device. For example, if the RAT type includes an LTE type and an NR type, a priority of the LTE type may be pre-configured to be higher than a priority of the NR type, and the corresponding reporting sequence may be that the data amount of the buffer data of the LTE type is more than the data amount of the buffer data of the NR type; or a priority of the NR type may be pre-configured to be higher than a priority of the LTE type, and the corresponding reporting sequence may be that the data amount of the buffer data of the NR type is more than the data amount of the buffer data of the LTE type.

In a second example, if the preset information of the buffer data of all the sidelink logical channels includes an SL transmission mode and there is more than one SL transmission mode, the step that the reporting sequence of the data amount of buffer data of different types is determined based on the preset information includes, the reporting sequence of the data amount of the buffer data of different SL service transmission modes in the buffer data is determined based on preset priorities of different SL service transmission modes.

The preset priorities of different SL transmission modes may be stipulated by a protocol, configured by a network device or pre-configured by a terminal device. For example, if the SL transmission mode includes unicast, groupcast and broadcast, a priority of a unicast transmission mode may be pre-configured to be higher than a priority of a groupcast transmission mode which is higher than a priority of a broadcast transmission mode, and the corresponding reporting sequence may be that the data amount of the buffer data corresponding to the unicast transmission mode is more than the data amount of the buffer data corresponding to the groupcast transmission mode which is more than the data amount of the buffer data corresponding to the broadcast transmission mode; or a priority of a broadcast transmission mode may be pre-configured to be higher than a priority of a groupcast transmission mode which is higher than a priority of a unicast transmission mode, and the corresponding reporting sequence may be that the data amount of the buffer data corresponding to the broadcast transmission mode is more than the data amount of the buffer data corresponding to the groupcast transmission mode which is more than the data amount of the buffer data corresponding to the unicast transmission mode.

In a third example, if the preset information of the buffer data of all the sidelink logical channels includes a QoS parameter and there is more than one QoS parameter, the step that the reporting sequence of the data amount of buffer data of different types is determined based on the preset information includes, the reporting sequence of the data amount of the buffer data of different QoS parameters in the buffer data is determined based on preset priorities of different QoS parameters.

The preset priorities of different QoS parameters may be stipulated by a protocol, configured by a network device or pre-configured by a terminal device. For example, if the QoS parameter includes a data packet or data flow of a plurality of priorities, the priority of the data packet or data flow with higher priority may be pre-configured to be higher than the priority of the data packet or data flow with lower priority, and the corresponding reporting sequence may be that the data amount of the data packet or data flow with high priority is more than the data amount of the data packet or data flow with low priority: or if the parameter includes a data packet or data flow of a plurality of latencies, the priority of the data packet or data flow with lower latency may be pre-configured to be higher than the priority of the data packet or data flow with higher latency, and the corresponding report sequence may be that the data amount of the data packet or data flow with lower latency is more than the data amount of the data packet or data flow with higher latency, and the like.

How to send the truncated SL BSR based on buffer data of different types is described below through several examples.

In an example, if there is more than one RAT type of the buffer data of all the sidelink logical channels, for example, including an LTE type and an NR type, and the reporting sequence is that the data amount of the buffer data of the NR type is more than the data amount of the buffer data of the LTE type, the truncated SL BSR firstly bears the data amount of the buffer data corresponding to an NR PC5 interface as much as possible and secondly bears the data amount of the buffer data corresponding to an LTE PC5 interface as much as possible until the uplink resource for sending the SL BSR is used up; or the reporting sequence is that the data amount of the buffer data of the LTE type is more than the data amount of the buffer data of the NR type, the truncated SL BSR firstly bears the data amount of the buffer data corresponding to an LTE PC5 interface as much as possible and secondly bears the data amount of the buffer data corresponding to an NR PC5 interface as much as possible until the uplink resource for sending the SL BSR is used up In another example, if there is more than SL transmission mode of the buffer data of all the sidelink logical channels, for example, may include three transmission modes: unicast, groupcast and broadcast, and the reporting sequence is that the data mount of the buffer data corresponding to the unicast transmission mode is more than the data mount of the buffer data corresponding to the groupcast transmission mode which is more than the data mount of the buffer data corresponding to the broadcast transmission mode, the truncated SL BSR firstly bears the data mount of the buffer data corresponding to the unicast transmission mode as much as possible, secondly bears the data mount of the buffer data corresponding to the groupcast transmission mode as much as possible and finally bears the data mount of the buffer data corresponding to the broadcast transmission mode until the uplink resource for sending the SL BSR is used up: or the reporting sequence is that the data mount of the buffer data corresponding to the broadcast transmission mode is more than the data mount of the buffer data corresponding to the groupcast transmission mode which is more than the data mount of the buffer data corresponding to the unicast transmission mode, the truncated SL BSR bears the data mount of the buffer data corresponding to the broadcast transmission mode as much as possible, secondly bears the data mount of the buffer data corresponding to the groupcast transmission mode as much as possible and finally bears the data mount of the buffer data corresponding to the unicast transmission mode until the uplink resource for sending the SL BSR is used up.

In yet another example, if there is more than QoS parameter of the buffer data of all the sidelink logical channels, for example, may include a data packet or data flow of a plurality of priorities, and the reporting sequence is that the data amount of the data packet or data flow with high priority is more than the data amount of the data packet or data flow with low priority, the truncated SL BSR firstly bears the data packet or data flow with high priority as much as possible and secondly bears the data packet or data flow with low priority as much as possible until the uplink resource for sending the SL BSR is used up. Alternatively, if there is more than one QoS parameter of the buffer data of all the sidelink logical channels, for example, may include a data packet or data flow of a plurality of latencies, and the reporting sequence is that the data amount of the data packet or data flow with low latency is more than the data amount of the data packet or data flow with high latency, the truncated SL BSR firstly bears the data amount of the data packet or data flow with low latency as much as possible and secondly bears the data amount of the data packet or data flow with high latency until the uplink resource for sending the SL BSR is used up.

It is not difficult to understand that in the first implementation manner, on one hand, compared with the related art that the buffer data size included in the LCG is reported as much as possible, when the uplink resource is not enough to report the total data amount of the buffer data of all the sidelink logical channels, the implementation manner may send the SL BSR which are truncated in different ways based on the preset information of the buffer data of all the sidelink logical channels, so a buffer status report solution with higher applicability may be provided. On the other hand, at least one domain of the format of the sent SL BSR is associated with the preset information and the truncated SL BSR sent by the terminal device carries the preset information, so the network device may acquire more comprehensive buffer status information of the terminal device, thereby assigning resources to the terminal device better and improving the communication effectiveness.

In a second implementation manner, the SL BSR in at least one SL BSR format are sent based on preset priorities, where the SL BSR format is determined based on preset information of the buffer data.

The preset information includes but is not limited to at least one of a RAT type or an SL service transmission mode. The RAT type may include at least one of a LTE type or a NR type. The SL service transmission mode may include at least one of unicast, groupcast or broadcast.

Optionally, the step that the SL BSR in at least one SL BSR format are sent based on preset priorities may include: a plurality of SL BSR formats for sending the data amount of the buffer data are determined based on the preset information; and the SL BSR in at least one SL BSR format is sent based on preset priorities of the plurality of SL BSR formats.

That is, a plurality of SL BSR formats may be pre-defined based on the preset information and the priorities of the plurality of SL BSR formats are defined, so that when the uplink resource is not enough to report the total data amount of the buffer data of all the sidelink logical channels, at least one SL BSR format is selected from the plurality of SL BSR formats according to the preset priorities of the plurality of the SL BSR for sending the SL BSR.

The plurality of SL BSR formats may be understood as special SL BSR formats: moreover, since the plurality of SL BSR formats are defined based on the preset information, sending the SL BSR of the SL BSR format to the network device means that the preset information is carried simultaneously.

For example, the SL BSR format of a data amount combination for sending one or more buffer data may be defined. Optionally, the SL BSR format for sending the data amount of the buffer data of the LTE type and/or the data amount of the buffer data of the NR type may be defined, and correspondingly, the SL BSR format may be represented as an NR sidelink BSR format, an LTE sidelink BSR format, an NR/LTE sidelink BSR format, and the like: or the SL BSR format for sending the data amount of the buffer data corresponding to at least one transmission mode of the unicast, groupcast and broadcast may be defined, and correspondingly, the SL BSR format may be represented as a unicast sidelink BSR format, a groupcast sidelink BSR format, a broadcast sidelink BSR format and the like.

Optionally, similar to related art, the plurality of SL BSR formats include the following domains: a destination index domain, a logical channel group index domain and a domain of buffer size level.

In the related art, the format of the SL BSR generally includes a destination index domain, a logical channel group index domain and a domain of buffer size level. Logical channel groups are often divided into four groups. The logical channel group index accounts for 2 bits in the SL BSR and is used to describe LCG ID corresponding to a buffer area of user equipment; and a length of the destination index may be configured, usually 16 groups, accounting for 4 bits; buffer size level is arranged in the sequence of progressively decreasing the priority of the SL logical channel included in the LCG, accounts for 6 bits and is used to specify the sum of the remaining effective data to be transmitted in a radio link control (RLC) layer and a packet data convergence protocol (PDCP) layer of all the logical channels in the LCG corresponding to a near service destination after all MAC protocol data units (PDU) in the transmission timing interval (TTI) when the SL user equipment sends the SL BSR are generated.

Figure 2:
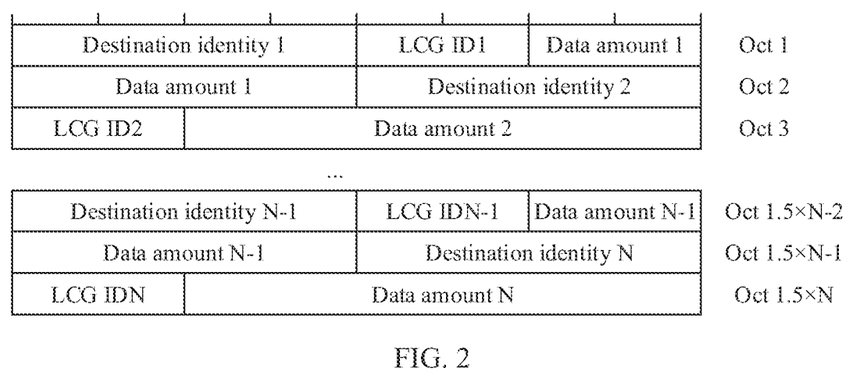
FIG. 2 is a first format schematic diagram of SL BSR according to an embodiment of the present disclosure.
Figure 3:
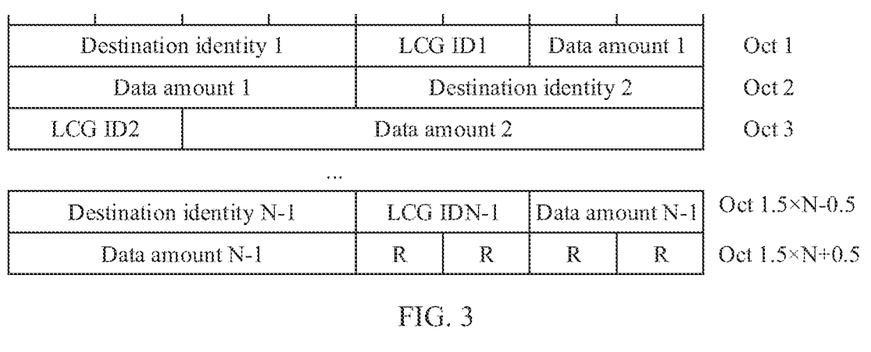
FIG. 3 is a second format schematic diagram of SL BSR according to an embodiment of the present disclosure.

FIG. 2 and FIG. 3 show schematic diagrams of two formats of SL BSR in related art respectively, where FIG. 2 is a schematic diagram of a BSR format in which a value of an index is an even number, and FIG. 3 is a schematic diagram of a BSR format in which a value of an index is an odd number. In FIG. 2 and FIG. 3, one line represents one octet, and N represents the maximum value of the index.

In the related art, the MAC layer adopts an MAC control element (CE) to report BSR, and the SL BSR and the truncated SL BSR uses the same MAC control element (CE). Each MAC CE correspondingly adopts one logical channel identity (LCID) for identification, and the following table 1 lists a corresponding relationship between an LCID value and a codepoint in an uplink-shared channel (UL-SCH).

In Table 1, the codepoint "10111" corresponds to the SL BSR format in the related art. The display association in the first implementation manner is equivalent to introducing at least one additional domain on the basis of the SL BSR format in the related art, for example, as shown in Table 2, it is equivalent to introducing sidelink BSR associated with NR and LTE on the basis of Table 1.

In the second implementation manner, it is equivalent to introducing an SL BSR of a new format on the basis of the SL BSR format in the related art, for example, as shown in Table 3, it is equivalent to introducing two new SL BSR formats of NR sidelink BSR and LTE sidelink BSR on the basis of Table 1, where codepoints of the two new SL BSR formats are to be determined.

TABLE 1

| Codepoint | LCID value |
|---|---|
| 00000 | Common control channel (CCCH) |
| 00001-01010 | Identity of the logical channel |
| 01011 | CCCH |
| 01100 | CCCH |
| 01101 | CCCH and extended power headroom report |
| 01110-01111 | Reserved |
| 10000 | Extended logical channel ID field |
| 10001 | Reserved |
| 10011 | Autonomous uplink (AUL) determines (one oct) |
| 10100 | Recommended bit rate query |
| 10101 | Semi-persistent scheduling (SPS) confirmation |
| 10110 | Truncated sidelink BSR |
| 10111 | Sidelink BSR (SL BSR) |
| 11000 | Dual connectivity power headroom report |
| 11001 | Extended power headroom report |
| 11010 | Power headroom report |
| 11011 | Cell radio network temporary identity (C-RNTI) |
| 11100 | Truncated BSR |
| 11101 | Short BSR |
| 11110 | Long BSR |
| 11111 | Padding |

TABLE 2

| 10111  | Sidelink BSR            |
|--------|-------------------------|
| xxxxxx | Sidelink BSR for NR and LTE |

TABLE 3

| 10111 | Sidelink BSR      |
|-------|-------------------|
| xxxxx | NR Sidelink BSR   |
| xxxxx | LTE Sidelink BSR  |

After a plurality of SL BSR formats are defined based on the preset information, the method shown in FIG. 1 may include: preset priorities of the plurality of SL BSR formats are determined based on the preset information.

In an example, if the preset information of the buffer data of all the sidelink logical channels includes an RAT type and there is more than one RAT type, the step that the preset priorities of the plurality of SL BSR formats are determined based on the preset information includes: the preset priorities of the plurality of SL BSR formats are determined based on different RAT types.

For example, a priority of an NR sidelink BSR format may be defined to be higher than a priority of an LTE sidelink BSR format. Correspondingly, when the uplink resource is not enough to report the total data amount of the buffer data of all the sidelink logical channels, the SL BSR of the NR sidelink BSR format may be preferentially sent.

Alternatively, a priority of an LTE sidelink BSR format may be defined to be higher than a priority of an NR sidelink BSR format. Correspondingly, when the uplink resource is not enough to report the total data amount of the buffer data of all the sidelink logical channels, the SL BSR of the LTE sidelink BSR format may be preferentially sent.

In another example, if the preset information of the buffer data of all the sidelink logical channels includes an SL transmission mode and there is more than one SL transmission mode, the step that the preset priorities of the plurality of SL BSR formats are determined based on the preset information includes: the preset priorities of the plurality of SL BSR formats are determined based on different SL service transmission modes.

For example, a priority of a unicast sidelink BSR format may be defined to be higher than a priority of a groupcast sidelink BSR format which is higher than a priority of a broadcast sidelink BSR format. Correspondingly, when the uplink resource is not enough to report the total data amount of the buffer data of all the sidelink logical channels, the SL BSR of the unicast sidelink BSR format may be preferentially sent, the SL BSR of the groupcast sidelink BSR format may be secondly sent, and the SL BSR of the broadcast sidelink BSR format may be finally sent.

Alternatively, a priority of a broadcast sidelink BSR format may be defined to be higher than a priority of a groupcast sidelink BSR format which is higher than a priority of a unicast sidelink BSR format may be defined. Correspondingly, when the uplink resource is not enough to report the total data amount of the buffer data of all the sidelink logical channels, the SL BSR of the broadcast sidelink BSR format may be preferentially sent, the SL BSR of the groupcast sidelink BSR format may be secondly sent, and the SL BSR of the unicast sidelink BSR format may be finally sent.

In addition to the sending sequence in the above two examples, it may be exhaustively listed based on the SL transmission mode included in the preset information, which is not listed here.

In yet another example, if the preset information of the buffer data of all the sidelink logical channels includes an SL transmission mode and an RAT type, the step that the preset priorities of the plurality of SL BSR formats are determined based on the preset information includes: the preset priorities of the plurality of SL BSR formats are determined based on the SL service transmission mode and the RAT type.

For example, if the preset information includes two RAT type: an LTE type and an NR type and the preset information includes two SL transmission modes: LTE broadcast and NR groupcast, a priority of an NR groupcast sidelink BSR format may be defined to be higher than a priority of an LTE broadcast sidelink BSR format. Correspondingly, when the uplink resource is not enough to report the total data amount of the buffer data of all the sidelink logical channels, the SL BSR of the NR groupcast sidelink BSR format may be preferentially sent and the SL BSR of the LTE broadcast sidelink BSR format may be secondly sent.

Alternatively, if the preset information includes two RAT types: an LTE type and an NR type and the preset information includes two SL transmission modes: LTE broadcast and NR broadcast, a priority of the LTE broadcast sidelink BSR format may be defined to be higher than a priority of the NR broadcast sidelink BSR format. Correspondingly, when the uplink resource is not enough to report the total data amount of the buffer data of all the sidelink logical channels, the SL BSR of the LTE broadcast sidelink BSR format may be preferentially sent and the SL BSR of the NR broadcast sidelink BSR format may be secondly sent.

The above is only to describe the processes of defining a plurality of SL BSR formats based on preset information and defining priorities of the plurality of SL BSR formats based on the preset information. It should be understood that the above examples are not exhaustive and do not constitute limitations on the technical solutions provided by the embodiments of the present disclosure.

It is not difficult to understand that in the second implementation manner, on one hand, compared with the related art that the buffer data size included in the LCG is reported as much as possible, when the uplink resource is not enough to report the total data amount of the buffer data of all the sidelink logical channels, the implementation manner may send the SL BSR in at least one SL BSR format based on the preset priorities, so a buffer status report solution with higher applicability may be provided. On the other hand, the format of the sent SL BSR is determined based on the preset information and the sent SL BSR indirectly carries the preset information, so the network device may learn more comprehensive buffer status information of the terminal device, thereby assigning resources to the terminal device better and improving the communication effectiveness.

In a word, according to the sidelink buffer status report sending method provided by the embodiment of the specification, on one hand, a buffer status reporting solution with higher applicability may be provided when the uplink resource is not enough to report the total data amount of the buffer data of all the sidelink logical channels; and on the other hand, when the data amount of the buffer data is reported, preset information of the buffer data can be carried directly or indirectly in the SL BSR: therefore, the network device may acquire more comprehensive buffer status information of the terminal device, thereby assigning resources to the terminal device better and improving communication effectiveness.

The sidelink buffer status report sending method applied to the terminal device is described above, and a sidelink buffer status report receiving method provided by the embodiment of the present disclosure is described below with reference to FIG. 4.

Figure 4:
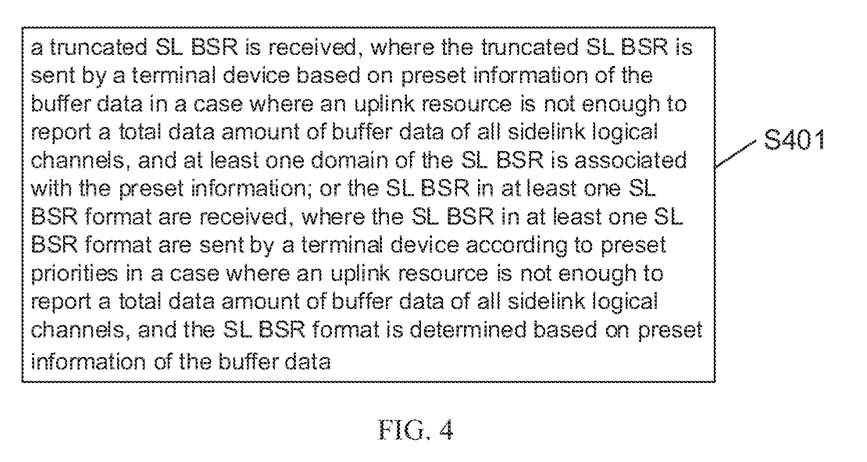
FIG. 4 is a schematic flowchart of a sidelink buffer status report receiving method according to an embodiment of the present disclosure.

As shown in FIG. 4, the embodiment of the present disclosure provides a sidelink buffer status report receiving method, applied to a network device. The method may include:

Step 401: a truncated SL BSR is received, where the truncated SL BSR is sent by a terminal device based on preset information of the buffer data in a case where an uplink resource is not enough to report a total data amount of buffer data of all sidelink logical channels, and at least one domain of the SL BSR is associated with the preset information; or the SL BSR in at least one SL BSR format are received, where the SL BSR in at least one SL BSR format are sent by a terminal device according to preset priorities in a case where an uplink resource is not enough to report a total data amount of buffer data of all sidelink logical channels, and the SL BSR format is determined based on preset information of the buffer data.

That is, in the embodiment of the present disclosure, when the uplink resource is not enough to report the total data amount of the buffer data of all the sidelink logical channels, the data amount (or data size) of the buffer data of the sidelink logical channel may be received through two implementation manners, which are described respectively below.

In the first implementation manner, the network device receives the truncated SL BSR.

Optionally, the truncated SL BSR received by the network device is sent by the terminal device based on the reporting sequence of the data amount of buffer data of different types, where the reporting sequence is determined based on the preset information and at least one domain of the received truncated SL BSR is associated with the preset information.

The at least one domain of the truncated SL BSR may be associated with the preset information in implicit or explicit ways, which be illustrated respectively below.

The preset information includes but is not limited to at least one of a radio access technology (RAT) type, an SL service transmission mode or a QoS parameter. The RAT type may include at least one of an LTE type, an NR type or a new RAT type which occurs subsequently. The SL service transmission mode may include at least one of unicast, groupcast or broadcast. The QoS parameter may include but is not limited to at least one of the followings: a priority of a data packet or data flow, a latency (in ms) of the data packet or data flow, a reliability (represented by percentage (%)) of the data packet or data flow, a communication range (in meter) of the data packet or data flow, a payload (in byte) of the data packet or data flow, a transmission rate (represented by message/sec) of the data packet or data flow, a data rate (in Mbps) of the data packet or data flow, or the like.

In a first example, at least one domain of the truncated SL BSR is associated with the preset information in an implicit way. Optionally, the format of the SL BSR (including the truncated SL BSR and the original SL BSR) includes: a destination index domain, a logical channel group index (LCG ID) domain and a buffer size level domain, where at least one of the destination index domain or the logical channel group index is associated with the preset information.

Based on this, optionally, the method shown in FIG. 4 may include: the preset information is determined based on at least one of the destination index domain or the logical channel group index domain.

The implicit association may be understood as establishing a mapping relationship between the destination index domain and/or the logical channel group index domain in the SL BSR format and the preset information, so that after receiving the SL BSR, the network device may know the preset information carried by the SL BSR based on the mapping relationship without directly carrying the preset information in the SL BSR.

In a second example, at least one domain of the truncated SL BSR is associated with the preset information in an explicit way. Optionally, the format of the SL BSR (including the truncated SL BSR and the original SL BSR) includes: a destination index domain, a logical channel group index domain, a domain of buffer size level and at least one additional domain, where the at least one additional domain is used to bear the preset information, so that the at least one additional domain is associated with the preset information. That is, the additional domain may be considered as a domain which is added in the format of the SL BSR specially for bearing the preset information.

Based on this, optionally, the method shown in FIG. 4 may further include: the preset information is determined based on the at least one additional domain.

It may be understood that no matter whether at least one domain of the format of the SL BSR (including the truncated SL BSR and the original SL BSR) is implicitly or explicitly associated with the preset information, the truncated SL BSR received by the network device carries the preset information: therefore, the network device may acquire more comprehensive buffer status information of the terminal device, thereby assigning resources to the terminal device better and improving the communication effectiveness.

How the terminal device determines the reporting sequence of the buffer data of different types and how to send the truncated SL BSR based on the reporting sequence of the buffer data of different types are referenced to the above description of the embodiment of the sidelink buffer status report sending method applied to the terminal device, which is not repeatedly described.

In a second implementation manner, the network device receives the SL BSR in at least one SL BSR format: moreover, as an example, the step that the SL BSR in at least one SL BSR format are received includes: the SL BSR in at least one SL BSR format are received based on priorities of a plurality of SL BSR formats, where the plurality of SL BSR formats are determined by the terminal device based on the preset information.

The preset information includes but is not limited to at least one of an RAT type or an SL service transmission mode. The RAT type may include at least one of an LTE type, an NR type or a new RAT type which occurs subsequently. The SL service transmission mode may include at least one of unicast, groupcast or broadcast.

The plurality of SL BSR formats may be understood as special SL BSR formats: moreover, since the plurality of SL BSR formats are defined based on the preset information, that the network device receives the SL BSR in the SL BSR format means that the preset information is received simultaneously.

Optionally, similar to related art, the plurality of SL BSR formats include the following domains: a destination index domain, a logical channel group index domain and a domain of buffer size level.

The display association in the first implementation manner is equivalent to introducing at least one additional domain on the basis of the SL BSR format in the related art, for example, as shown in Table 2, it is equivalent to introducing sidelink BSR associated with NR and LTE on the basis of Table 1.

In the second implementation manner, it is equivalent to introducing an SL BSR of a new format on the basis of the SL BSR format in the related art, for example, as shown in Table 3, it is equivalent to introducing two new SL BSR formats of NR sidelink BSR and LTE sidelink BSR on the basis of Table 1, where codepoints of the two new SL BSR formats are to be determined.

How the terminal device determines the preset priorities of the plurality of SL BSR formats based on the preset information and how to send the SL BSR in at least one SL BSR format based on the preset priorities of the plurality of SL BSR formats are referenced to the above description of the embodiment of the sidelink buffer status report sending method applied to the terminal device, which is not repeatedly described.

According to the sidelink buffer status report receiving method provided by the embodiment of the specification, on one hand, a buffer status reporting solution with higher applicability may be provided when the uplink resource is not enough to report the total data amount of the buffer data of all the sidelink logical channels; and on the other hand, when the data amount of the buffer data is received, preset information of the buffer data can be received directly or indirectly; therefore, the network device may acquire more comprehensive buffer status information of the terminal device, thereby assigning resources to the terminal device better and improving communication effectiveness.

The sidelink buffer status report receiving method applied to the network device is described above, and user equipment and a network device according to the embodiments of the present disclosure are described in detail below with reference to FIG. 5 to FIG. 6.

Figure 5:
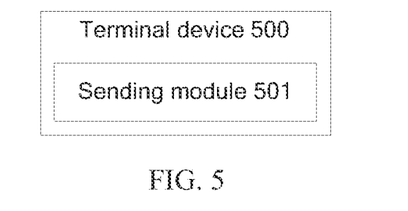
FIG. 5 is a structural schematic diagram of user equipment 500 according to an embodiment of the present disclosure.

FIG. 5 shows a structural schematic diagram of user equipment according to an embodiment of the present disclosure. As shown in FIG. 5, the terminal device 500 may include: a sending module 501.

The sending module 501 is used to: in a case where an uplink resource is not enough to report a total data amount of buffer data of all sidelink logical channels, send a truncated SL BSR based on preset information of the buffer data, where at least one domain of the SL BSR is associated with the preset information: or used to: in a case where an uplink resource is not enough to report a total data amount of buffer data of all sidelink logical channels, send the SL BSR in at least one SL BSR format based on preset priorities, where the SL BSR format is determined based on preset information of the buffer data.

That is, in the embodiment of the present disclosure, when the uplink resource is not enough to report the total data amount of the buffer data of all the sidelink logical channels, the sending module 501 may report the data amount (or data size) of the buffer data of the sidelink logical channel through two implementation manners, which are described respectively below.

In a first implementation manner, the sending module 501 may send a truncated SL BSR based on preset information of buffer data of all the sidelink logical channels, and at least one domain of the sent truncated SL BSR is associated with the preset information. The at least one domain of the truncated SL BSR may be associated with the preset information in implicit or explicit ways, which will be illustrated respectively below.

The preset information includes but is not limited to at least one of an RAT type, an SL service transmission mode or a QoS parameter.

The RAT type may include at least one of an LTE type, an NR type or a new RAT type which occurs subsequently.

The SL service transmission mode may include at least one of unicast, groupcast or broadcast.

The QoS parameter may include but is not limited to at least one of the followings: a priority of a data packet or data flow, a latency (in ms) of the data packet or data flow, a reliability (represented by percentage (%)) of the data packet or data flow, a communication range (in meter) of the data packet or data flow, a payload (in byte) of the data packet or data flow, a transmission rate (represented by message/sec) of the data packet or data flow, a data rate (in Mbps) of the data packet or data flow, or the like.

In a first example, at least one domain of the truncated SL BSR is associated with the preset information in an implicit way. Optionally, the format of the SL BSR (including the truncated SL BSR and the original SL BSR) includes: a destination index domain, a logical channel group index (LCG ID) domain and a buffer size level domain, where at least one of the destination index domain or the logical channel group index is associated with the preset information.

The implicit association may be understood as establishing a mapping relationship between the destination index domain and/or the logical channel group index domain in the SL BSR format and the preset information, so that after user equipment sends the SL BSR to a network device, the network device may know the preset information carried by the SL BSR based on the mapping relationship without directly carrying the preset information in the SL BSR In a second example, at least one domain of the truncated SL BSR is associated with the preset information in an explicit way. Optionally, the format of the SL BSR (including the truncated SL BSR and the original SL BSR) includes: a destination index domain, a LCG ID domain, a buffer size level domain and at least one additional domain, where the at least one additional domain is used to bear the preset information, so that the at least one additional domain is associated with the preset information. That is, the additional domain may be considered as a domain which is added in the format of the SL BSR specially for bearing the preset information.

It may be understood that no matter whether at least one domain of the format of the SL BSR (including the truncated SL BSR and the original SL BSR) is implicitly or explicitly associated with the preset information, the truncated SL BSR sent by the terminal device carries the preset information: therefore, the network device may learn more comprehensive buffer status information of the terminal device, thereby assigning resources to the terminal device better and improving the communication effectiveness.

On the premise of the first example and the second example, a sending module 501 may be used to: determine the reporting sequence of the data amount of buffer data of different types based on the preset information of the buffer data of all the sidelink logical channels, and send the truncated SL BSR based on the reporting sequence, so that the data amount of the buffer data is reported when the uplink resource is not enough to report the total data amount of the buffer data of all the sidelink logical channels.

Optionally, the sending module 501 may be used to: determine target buffer data ranked in the top based on the reporting sequence; and then send SL BSR which preferentially bears the data amount of the target buffer data in sequence, that is, send the amount of the buffer data ranked in the top as much as possible.

How to determine the reporting sequence of the data amount of buffer data of different types is described below through several examples.

In one example, if the preset information of the buffer data of all the sidelink logical channels includes an RAT type and there is more than one RAT type, the sending module 501 may be used to: determine the reporting sequence of the data amount of buffer data of different RAT types in the buffer data based on preset priorities of different RAT types.

The preset priorities of different RAT types may be stipulated by a protocol, configured by a network device or pre-configured by a terminal device.

In a second example, if the preset information of the buffer data of all the sidelink logical channels includes an SL transmission mode and there is more than SL transmission mode, the sending module 501 may be used to: determine the reporting sequence of the data amount of the buffer data corresponding to different SL service transmission modes in the buffer data based on preset priorities of different SL service transmission modes.

The preset priorities of different SL transmission modes may be stipulated by a protocol, configured by a network device or pre-configured by a terminal device.

In a third example, if the preset information of the buffer data of all the sidelink logical channels includes a QoS parameter and there is more than one QoS parameter, the sending module 501 may be used to: determine the reporting sequence of the data amount of the buffer data corresponding to different QoS parameters in the buffer data based on priorities of different QoS parameters.

The preset priorities of different QoS parameters may be stipulated by a protocol, configured by a network device or pre-configured by a terminal device.

How the sending module 501 sends the truncated SL BSR based on the reporting sequence of buffer data of different types size is referenced to the above description of the embodiment of the method shown in FIG. 1, which is not described repeatedly.

In a second implementation manner, the sending module 501 is used to send the SL BSR in at least one SL BSR format based on preset priorities, where the SL BSR format is determined based on preset information of the buffer data.

The preset information includes but is not limited to at least one of an RAT type or an SL service transmission mode. The RAT type may include at least one of an LTE type, an NR type or a new RAT type which occurs subsequently. The SL service transmission mode may include at least one of unicast, groupcast or broadcast.

Optionally, the sending module 501 may be used to: determine a plurality of SL BSR formats for sending the data amount of the buffer data based on the preset information, and send the SL BSR in at least one SL BSR format based on preset priorities of the plurality of SL BSR formats.

That is, the sending module 501 may pre-define a plurality of SL BSR formats based on the preset information and define the priorities of the plurality of SL BSR formats, so that when the uplink resource is not enough to report the total data amount of the buffer data of all the sidelink logical channels, at least one SL BSR format is selected from the plurality of SL BSR formats according to the preset priorities of the plurality of the SL BSR for sending the SL BSR.

The plurality of SL BSR formats may be understood as special SL BSR formats; moreover, since the plurality of SL BSR formats are defined based on the preset information, sending the SL BSR of the SL BSR format to the network device means that the preset information is carried.

Optionally, similar to related art, the plurality of SL BSR formats include the following domains: a destination index domain, a logical channel group index domain and a domain of buffer size level.

The display association in the first implementation manner is equivalent to introducing at least one additional domain on the basis of the SL BSR format in the related art, for example, as shown in Table 2, it is equivalent to introducing sidelink BSR associated with NR and LTE on the basis of Table 1.

In the second implementation manner, it is equivalent to introducing an SL BSR of a new format on the basis of the SL BSR format in the related art, for example, as shown in Table 3, it is equivalent to introducing two new SL BSR formats of NR sidelink BSR and LTE sidelink BSR on the basis of Table 1, where codepoints of the two new SL BSR formats are to be determined.

After a plurality of SL BSR formats are defined based on the preset information, the terminal device 500 shown in FIG. 5 may further include: a priority determining module, used to determine preset priorities of the plurality of SL BSR formats based on the preset information.

In one example, if the preset information of the buffer data of all the sidelink logical channels includes an RAT type and there is more than one RAT type, the priority determining module may be used to: determine preset priorities of the plurality of SL BSR formats based on different RAT types.

In another example, if the preset information of the buffer data of all the sidelink logical channels includes an SL transmission mode and there is more than one SL transmission mode, the priority determining module may be used to: determine preset priorities of the plurality of SL BSR formats based on different SL service transmission modes.

In yet another example, if the preset information of the buffer data of all the sidelink logical channels includes an SL transmission mode and an RAT type, the priority determining module may be used to: determine preset priorities of the plurality of SL BSR formats based on the SL service transmission mode and the RAT type.

It is not difficult to understand that in the second implementation manner, on one hand, compared with the related art that the buffer data size included in the LCG is reported as much as possible, when the uplink resource is not enough to report the total data amount of the buffer data of all the sidelink logical channels, the implementation manner may send the SL BSR in at least one SL BSR format based on the preset priorities, so a buffer status report solution with higher applicability may be provided. On the other hand, the format of the sent SL BSR is determined based on the preset information and the sent SL BSR indirectly carries the preset information, so the network device may learn more comprehensive buffer status information of the terminal device, thereby assigning resources to the terminal device better and improving the communication effectiveness.

In a word, according to user equipment 500 provided by the embodiment of the specification, on one hand, a buffer status reporting solution with higher applicability may be provided when the uplink resource is not enough to report the total data amount of the buffer data of all the sidelink logical channels; and on the other hand, when the data amount of the buffer data is reported, preset information of the buffer data can be carried directly or indirectly in the SL BSR: therefore, the network device may acquire more comprehensive buffer status information of the terminal device, thereby assigning resources to the terminal device better and improving communication effectiveness.

The terminal device 50) shown in FIG. 5 may be used to implement various embodiments of the sidelink buffer status report sending method shown in FIG. 1, and the relevant parts are reference to the above method embodiment.

The terminal device 500 is described above, and a network device 600 provided by the embodiment of the present disclosure is described below with reference to FIG. 6.

Figure 6:
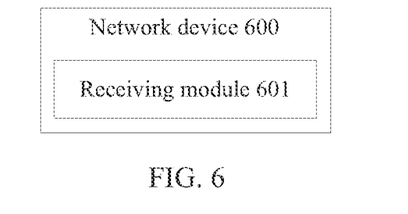
FIG. 6 is a structural schematic diagram of a network device 600 according to an embodiment of the present disclosure.

FIG. 6 shows a structural schematic diagram of a network device according to an embodiment of the present invention. As shown in FIG. 6, the network device 600 may include: a receiving module 601.

The receiving module 601 is used to receive a truncated SL BSR, where the truncated SL BSR is sent by a terminal device based on preset information of the buffer data in a case where an uplink resource is not enough to report a total data amount of buffer data of all sidelink logical channels, and at least one domain of the SL BSR is associated with the preset information; or used to receive the SL BSR in at least one SL BSR format, where the SL BSR in at least one SL BSR format is sent by a terminal device according to preset priorities in a case where an uplink resource is not enough to report a total data amount of buffer data of all sidelink logical channels, and the SL BSR format is determined based on preset information of the buffer data.

That is, in the embodiment of the present disclosure, when the uplink resource is not enough to report the total data amount of the buffer data of all the sidelink logical channels, the data amount (or data size) of the buffer data of the sidelink logical channel may be received through two implementation manners, which are described respectively below.

In a first implementation manner, the receiving module 601 is used to receive a truncated SL BSR.

Optionally, the truncated SL BSR received by the receiving module 601 is sent by the terminal device based on the reporting sequence of the data amount of buffer data of different types, where the reporting sequence is determined based on the preset information and at least one domain of the received truncated SL BSR is associated with the preset information.

The at least one domain of the truncated SL BSR may be associated with the preset information in implicit or explicit ways, which will be illustrated respectively below.

The preset information includes but is not limited to at least one of a RAT type, an SL service transmission mode or a QoS parameter. The RAT type may include at least one of an LTE type, an NR type or a new RAT type which occurs subsequently. The SL service transmission mode may include at least one of unicast, groupcast or broadcast; the QoS parameter may include but is not limited to at least one of the followings: a priority of a data packet or data flow, a latency (in ms) of the data packet or data flow, a reliability (represented by percentage (%)) of the data packet or data flow, a communication range (in meter) of the data packet or data flow, a payload (in byte) of the data packet or data flow, a transmission rate (represented by message/sec) of the data packet or data flow, a data rate (in Mbps) of the data packet or data flow, or the like.

In a first example, at least one domain of the truncated SL BSR is associated with the preset information in an implicit way. Optionally, the format of the SL BSR (including the truncated SL BSR and the original SL BSR) includes: a destination index domain, a LCG ID domain and a buffer size level (Buffer size level) domain, where at least one of the destination index domain or the logical channel group index is associated with the preset information.

Based on this, optionally, the network device shown in FIG. 6 may include: a first determining module, used to determine the preset information based on at least one of the destination index domain or the logical channel group index domain.

The implicit association may be understood as establishing a mapping relationship between the destination index domain and/or the logical channel group index domain in the SL BSR format and the preset information, so that after receiving the SL BSR, the network device may know the preset information carried by the SL BSR based on the mapping relationship without directly carrying the preset information in the SL BSR In a second example, at least one domain of the truncated SL BSR is associated with the preset information in an explicit way. Optionally, the format of the SL BSR (including the truncated SL BSR and the original SL BSR) includes: a destination index domain, a logical channel group index domain, a domain of buffer size level and at least one additional domain, where the at least one additional domain is used to bear the preset information, so that the at least one additional domain is associated with the preset information.

That is, the additional domain may be considered as a domain which is added in the format of the SL BSR specially for bearing the preset information.

Based on this, optionally, the network device shown in FIG. 6 may further include: a first determining module, used to determine the preset information based on the at least one additional domain.

It may be understood that no matter whether at least one domain of the format of the SL BSR (including the truncated SL BSR and the original SL BSR) is implicitly or explicitly associated with the preset information, the truncated SL BSR received by the network device carries the preset information; therefore, the network device may learn more comprehensive buffer status information of the terminal device, thereby assigning resources to the terminal device better and improving the communication effectiveness.

How the terminal device determines the reporting sequence of the buffer data of different types and how to send the truncated SL BSR based on the reporting sequence of the buffer data of different types are referenced to the above description of the embodiment of the sidelink buffer status report sending method applied to the terminal device, which is not repeatedly described.

In a second implementation manner, the receiving module 601 is used to receive the SL BSR in at least one SL BSR format, moreover, as an example, the receiving module 601 may be used to: receive the SL BSR in at least one SL BSR format based on preset priorities of a plurality of SL BSR formats, where the plurality of SL BSR formats are determined by the terminal device based on the preset information.

The preset information includes but is not limited to at least one of an RAT type or an SL service transmission mode. The RAT type may include at least one of an LTE type, an NR type or a new RAT type which occurs subsequently. The SL service transmission mode may include at least one of unicast, groupcast or broadcast.

The plurality of SL BSR formats may be understood as special SL BSR formats: moreover, since the plurality of SL BSR formats are defined based on the preset information, that the network device receives the SL BSR in the SL BSR format means that the preset information is received simultaneously.

Optionally, similar to related art, the plurality of SL BSR formats include the following domains: a destination index domain, a logical channel group index domain and a domain of buffer size level.

The display association in the first implementation manner is equivalent to introducing at least one additional domain on the basis of the SL BSR format in the related art, for example, as shown in Table 2, it is equivalent to introducing sidelink BSR associated with NR and LTE on the basis of Table 1.

In the second implementation manner, it is equivalent to introducing an SL BSR of a new format on the basis of the SL BSR format in the related art, for example, as shown in Table 3, it is equivalent to introducing two new SL BSR formats of NR sidelink BSR and LTE sidelink BSR on the basis of Table 1, where codepoints of the two new SL BSR formats are to be determined.

How the terminal device determines the preset priorities of the plurality of SL BSR formats based on the preset information and how to send the SL BSR in at least one SL BSR format based on the preset priorities of the plurality of SL BSR formats are referenced to the above description of the embodiment of the sidelink buffer status report sending method applied to the terminal device, which is not repeatedly described.

According to a network device 600 provided by the embodiment of the specification, on one hand, a buffer status reporting solution with higher applicability may be provided when the uplink resource is not enough to report the total data amount of the buffer data of all the sidelink logical channels; and on the other hand, when the data amount of the buffer data is received, preset information of the buffer data can be received directly or indirectly: therefore, the network device may acquire more comprehensive buffer status information of the terminal device, thereby assigning resources to the terminal device better and improving communication effectiveness.

The network device 600 shown in FIG. 6 may be used to implement various embodiments of the sidelink buffer status report receiving method shown in FIG. 4, and the relevant parts are referenced to the above method embodiment.

Figure 7:
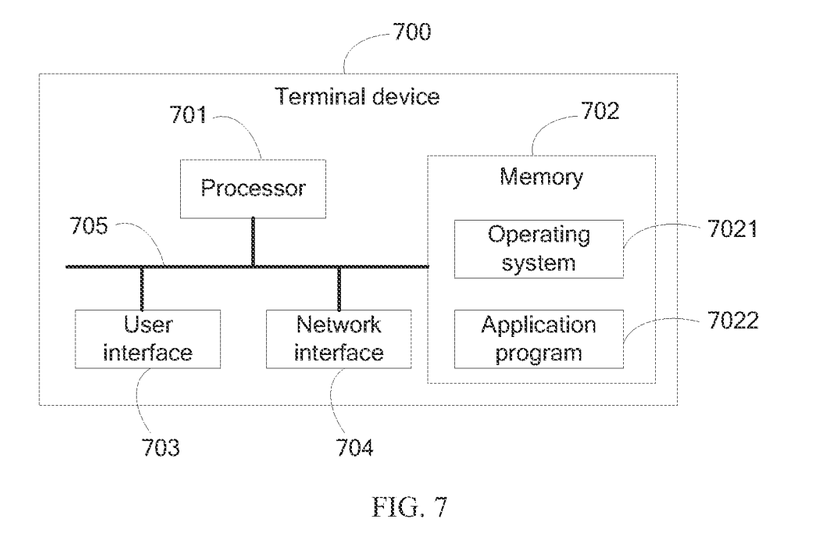
FIG. 7 is a structural schematic diagram of user equipment 700 according to an embodiment of the present disclosure.

FIG. 7 is a schematic structural diagram of a user equipment according to another embodiment of the present disclosure. The terminal device 700 shown in FIG. 7 includes at least one processor 701, a memory 702, at least one network interface 704, and a user interface 703. The components in the terminal device 700 are coupled together through a bus system 705. It may be understood that the bus system 705 is used to implement connection and communication between these components. In addition to a data bus, the bus system 705 also includes a power bus, a control bus, and a status signal bus. However, for clear description, various buses are marked as the bus system 705 in FIG. 7.

The user interface 703 may include a display, a keyboard, a clicking device, for example, a mouse, a trackball, a touch panel, or a touchscreen.

It may be understood that the memory 702 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of exemplary but not restrictive description, many forms of RAMs are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synch link dynamic random access memory (SLDRAM), and a direct rambus random access memory (DRRAM). The memory 702 of the system and the method described in the embodiments of the present disclosure is intended to include, but is not limited to, these and any other suitable types of memories.

In some implementation manners, the memory 702 stores the following elements: executable modules or data structures, a subset thereof, or an extended set thereof: an operating system 7021 and an application program 7022.

The operating system 7021 includes various system programs, for example, a framework layer, a kernel library layer, and a driver layer, and is used to implement various basic services and process hardware-based tasks. The application program 7022 includes various application programs, for example, a media player and a browser, and is used to implement various application services. A program for implementing the method in the embodiments of the present disclosure may be included in the application program 7022.

In the embodiments of the present disclosure, the terminal device 700 further includes: a computer program which is stored on the memory 702 and may run on the processor 701, where when being executed by the processor 701, the computer program implements various processes of the sidelink buffer status report sending method, and the same technical effect can be achieved. In order to avoid repetition, details are not described herein again.

The method disclosed in the embodiments of the present disclosure may be applied to the processor 701 or implemented by the processor 701. The processor 701 may be an integrated circuit chip having a signal processing capability. During implementation, the steps of the foregoing method may be completed by hardware integrated logic circuits in the processor 701 or instructions in a form of software. The processor 701 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 702, and the processor 701 reads information from the memory 702 and completes the steps of the foregoing method in combination with hardware of the processor. Optionally, the non-transitory computer-readable storage medium stores a computer program. When being executed by the processor 701, the computer program implements the steps of the above sidelink buffer status report sending method embodiments.

Figure 8:
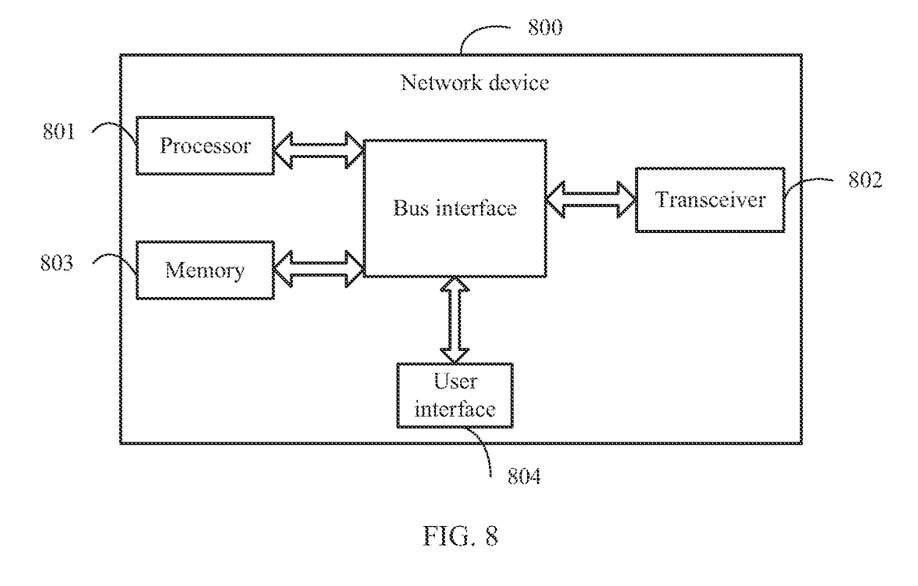
FIG. 8 is a structural schematic diagram of a network device 800 according to an embodiment of the present disclosure.

Referring to FIG. 8 which is a structural diagram of a network device applied in an embodiment of the present disclosure, the details of the above sidelink buffer status report receiving method can be realized and the same effect can be achieved. As shown in FIG. 8, the network device 800 includes: a processor 801, transceiver 802, a memory 803, a user interface 804 and a bus interface.

In the embodiments of the present disclosure, the network device 800 further includes: a computer program which is stored on the memory 803 and may run on the processor 801, where when being executed by the processor 801, the computer program implements various processes of the sidelink buffer status report receiving method, and the same technical effect can be achieved. In order to avoid repetition, details are not described herein again.

In FIG. 8, a bus architecture may include any quantity of interconnected buses and bridges that may be linked together by various circuits of at least one processor represented by the processor 801 and a memory represented by the memory 803. The bus architecture may further link together various other circuits such as peripheral devices, voltage regulators, and power management circuits. These are all known in the art, and therefore, no further description is provided herein. The bus interface provides an interface. The transceiver 802 may include a plurality of elements, that is, include a transmitter and a receiver, and provide units for communication with various other devices on a transmission medium. For different user equipment, the user interface 804 may also be an interface capable of connecting externally and internally to a required device. The connected device includes but is not limited to a keypad, a display, a speaker, a microphone, a joystick, or the like.

The processor 801 is responsible for managing the bus architecture and common processing, and the memory 803 may store data used when the processor 801 performs an operation.

It can be understood that these embodiments described in the embodiments of the present disclosure may be implemented with hardware, software, firmware, middleware, microcode, or a combination thereof. For hardware implementation, a processing unit can be implemented in at least one application-specific integrated circuit (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic units used to perform the functions described in this disclosure, or a combination thereof.

For implementation with software, technologies described in the embodiments of the present disclosure may be implemented by executing functional modules (for example, a process and a function) in the embodiments of the present disclosure. Software code may be stored in the memory and executed by the processor. The memory may be implemented inside or outside the processor.

The embodiments of the present disclosure further provide a non-transitory computer-readable storage medium. The non-transitory computer-readable storage medium stores a computer program, and when a processor executes the computer program, the processes of the above sidelink buffer status report sending method embodiment are implemented and the same technical effect can be achieved. To avoid repetition, details are not described herein again. The non-transitory computer-readable storage medium may be a read-only memory (ROM), a random access memory (RAM), a magnetic disk, a compact disc, or the like.

The embodiments of the present disclosure further provide a computer program product including instructions. When a computer runs the instructions of the computer program product, the computer performs the above sidelink feedback information sending method or the above sidelink feedback information receiving method. Optionally, the computer program product may run on the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a non-transitory computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The aforementioned storage medium includes various mediums that may store a program code, such as a USB flash drive, a mobile hard disk, a ROM, a RAM, a magnetic disk, or an optical disk.

A person of ordinary skill in the art can understand that all or some of the procedures in the methods of the foregoing embodiments may be implemented by a computer program controlling related hardware. The program may be stored in a non-transitory computer-readable storage medium. When the program is executed, the procedures of the embodiments of the foregoing methods may be performed. The foregoing storage medium may be a magnetic disk, an optical disc, a ROM, a RAM, or the like. The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A sidelink buffer status report (SL BSR) sending method, applied to a terminal device, comprising:
   in a case where an uplink resource is not enough to report a total data amount of buffer data of all sidelink logical channels, sending a truncated SL BSR based on preset information of the buffer data, at least one domain of the SL BSR being associated with the preset information; or
   in a case where an uplink resource is not enough to report a total data amount of buffer data of all sidelink logical channels, sending a SL BSR in at least one SL BSR format based on preset priorities, the SL BSR format being determined based on the preset information of the buffer data;
   wherein the preset information comprises an SL service transmission mode; and the sending the truncated SL BSR based on the preset information of the buffer data comprises:
   determining a reporting sequence of a data amount of buffer data corresponding to different SL service transmission modes in the buffer data based on preset priorities of different SL service transmission modes; and
   sending the truncated SL BSR based on the reporting sequence;
   wherein the sending the SL BSR in the at least one SL BSR format based on the preset priorities comprises:
   determining a plurality of SL BSR formats for sending the data amount of the buffer data based on the preset information; and
   sending the SL BSR in the at least one SL BSR format based on the preset priorities in the plurality of SL BSR formats; and
   wherein the SL service transmission mode comprises at least one of unicast, groupcast or broadcast.

2. The method according to claim 1, wherein
the sending the truncated SL BSR based on the reporting sequence comprising:
   determining target buffer data ranked in the top based on the reporting sequence; and
   sending SL BSR which preferentially bears the data amount of the target buffer data in sequence.

3. The method according to claim 1, wherein
the SL BSR format comprises a destination index domain, a logical channel group index domain and a domain of buffer size level, at least one of the destination index domain or the logical channel group index domain being associated with the preset information; or
the SL BSR format comprises a destination index domain, a logical channel group index domain, a domain of buffer size level and at least one additional domain; the at least one additional domain being used to bear the preset information.

4. The method according to claim 1, wherein the preset information further comprises at least one of a radio access technology (RAT) type or a quality of service (QoS) parameter.

5. The method according to claim 4, wherein
the RAT type comprises at least one of a long term evolution (LTE) type, a new ratio (NR) type or a new RAT type which occurs subsequently;
or
the QoS parameter comprises a priority of a data packet or data flow, a latency of the data packet or data flow, a reliability of the data packet or data flow, a communication range of the data packet or data flow, a payload of the data packet or data flow, a transmission rate of the data packet or data flow and a data rate of the data packet or data flow.

6. The method according to claim 1, further comprising:
   determining the preset priorities of the plurality of SL BSR formats based on the preset information.

7. The method according to claim 6, wherein the determining the preset priorities of the plurality of SL BSR formats based on the preset information comprises:
   determining the preset priorities of the plurality of SL BSR formats based on different SL service transmission modes; or
   the preset information further comprises a radio access technology (RAT) type, and the determining the preset priorities of the plurality of SL BSR formats based on the preset information comprises:
   determining the preset priorities of the plurality of SL BSR formats based on the SL service transmission mode and the RAT type.

8. A sidelink buffer status report (SL BSR) receiving method, applied to a network device, comprising:
   receiving a truncated SL BSR, wherein the truncated SL BSR is sent by a terminal device based on preset information of the buffer data in a case where an uplink resource is not enough to report a total data amount of buffer data of all sidelink logical channels, and at least one domain of the SL BSR is associated with the preset information; or
   receiving a SL BSR in at least one SL BSR format, wherein the SL BSR in at least one SL BSR format are sent by a terminal device according to preset priorities in a case where an uplink resource is not enough to report a total data amount of buffer data of all sidelink logical channels, and the SL BSR format is determined based on the preset information of the buffer data;
   wherein the preset information comprises an SL service transmission mode; and the truncated SL BSR is sent by the terminal device based on a reporting sequence of data amount of buffer data corresponding to different SL service transmission modes in the buffer data, wherein the reporting sequence is determined based on the preset priorities of different SL service transmission modes;
   wherein the SL BSR in the at least one SL BSR format are sent by the terminal device based on preset priorities in a plurality of SL BSR formats and the plurality of SL BSR formats are determined based on the preset information; and wherein the SL service transmission mode comprises at least one of unicast, groupcast or broadcast.

9. The method according to claim 8, wherein
the SL BSR format comprises a destination index domain, a logical channel group index domain and a domain of buffer size level, and at least one of the destination index domain or the logical channel group index domain is associated with the preset information, the method further comprises:
determining the preset information based on at least one of the destination index domain or the logical channel group index domain.

10. The method according to claim 8, wherein
the SL BSR format comprises a destination index domain, a logical channel group index domain, a domain of buffer size level, and at least one additional domain and the at least additional domain is used to bear the preset information, the method further comprises:
determining the preset information based on the at least one additional domain.

11. A network device, comprising a memory, a processor and a radio communication program which is stored in the memory and executable on the processor, wherein when the radio communication program is executed by the processor, the following steps of the method according to claim 8 are performed:
receiving a truncated SL BSR, wherein the truncated SL BSR is sent by a terminal device based on preset information of the buffer data in a case where an uplink resource is not enough to report a total data amount of buffer data of all sidelink logical channels, and at least one domain of the SL BSR is associated with the preset information; or
receiving a SL BSR in at least one SL BSR format, wherein the SL BSR in at least one SL BSR format are sent by a terminal device according to preset priorities in a case where an uplink resource is not enough to report a total data amount of buffer data of all sidelink logical channels, and the SL BSR format is determined based on the preset information of the buffer data;
wherein the preset information comprises an SL service transmission mode; and the truncated SL BSR is sent by the terminal device based on a reporting sequence of a data amount of buffer data corresponding to different SL service transmission modes in the buffer data, wherein the reporting sequence is determined based on the preset priorities of different SL service transmission modes;
wherein the SL BSR in the at least one SL BSR format are sent by the terminal device based on preset priorities in a plurality of SL BSR formats, wherein the plurality of SL BSR formats are determined based on the preset information; and
wherein the SL service transmission mode comprises at least one of unicast, groupcast or broadcast.

12. The network device according to claim 11, wherein the preset information further comprises at least one of a radio access technology (RAT) type or a quality of service (QoS) parameter.

13. The method according to claim 8, wherein the preset information further comprises at least one of a radio access technology (RAT) type or a quality of service (QoS) parameter.

14. A terminal device, comprising a memory, a processor and a computer program which is stored in the memory and executable on the processor, wherein the computer program, when executed by the processor, causes the terminal device to perform:
in a case where an uplink resource is not enough to report a total data amount of buffer data of all sidelink logical channels, sending a truncated SL BSR based on preset information of the buffer data, at least one domain of the SL BSR being associated with the preset information; or
in a case where an uplink resource is not enough to report a total data amount of buffer data of all sidelink logical channels, sending the SL BSR in at least one SL BSR format based on preset priorities, the SL BSR format being determined based on the preset information of the buffer data;
wherein the preset information comprises an SL service transmission mode; and the computer program, when executed by the processor, causes the terminal device to perform:
determining a reporting sequence of a data amount of buffer data corresponding to different SL service transmission modes in the buffer data based on preset priorities of different SL service transmission modes; and
sending the truncated SL BSR based on the reporting sequence;
wherein the computer program, when executed by the processor, causes the terminal device to perform:
determining a plurality of SL BSR formats for sending the data amount of the buffer data based on the preset information; and
sending the SL BSR in the at least one SL BSR format based on the preset priorities in the plurality of SL BSR formats; and
wherein the SL service transmission mode comprises at least one of unicast, groupcast or broadcast.

15. The terminal device according to claim 14, wherein the preset information further comprises at least one of a radio access technology (RAT) type or a quality of service (QoS) parameter.

16. The terminal device according to claim 15, wherein
the RAT type comprises at least one of a long term evolution (LTE) type, a new ratio (NR) type or a new RAT type which occurs subsequently;
or
the QoS parameter comprises a priority of a data packet or data flow, a latency of the data packet or data flow, a reliability of the data packet or data flow, a communication range of the data packet or data flow, a payload of the data packet or data flow, a transmission rate of the data packet or data flow and a data rate of the data packet or data flow.

17. The terminal device according to claim 14, wherein the computer program, when executed by the processor, causes the terminal device to perform:
determining target buffer data ranked in the top based on the reporting sequence; and
sending SL BSR which preferentially bears the data amount of the target buffer data in sequence.

18. The terminal device according to claim 14, wherein
the SL BSR format comprises a destination index domain, a logical channel group index domain and a domain of buffer size level, at least one of the destination index domain or the logical channel group index domain being associated with the preset information; or the SL BSR format comprises a destination index domain, a logical channel group index domain, a domain of buffer size level and at least one additional domain; the at least one additional domain being used to bear the preset information.

19. The terminal device according to claim 14, wherein the computer program, when executed by the processor, causes the terminal device to further perform:
determining the preset priorities of the plurality of SL BSR formats based on the preset information.

20. The terminal device according to claim 19, wherein the computer program, when executed by the processor, causes the terminal device to perform:
determining the preset priorities of the plurality of SL BSR formats based on different SL service transmission modes; or
the preset information further comprises a radio access technology (RAT) type, and the computer program, when executed by the processor, causes the terminal device to perform:
determining the preset priorities of the plurality of SL BSR formats based on the SL service transmission mode and the RAT type.

* * * * *